US005467596A

United States Patent [19]
Yu

[11] Patent Number: 5,467,596
[45] Date of Patent: Nov. 21, 1995

[54] UNITARY ELECTRO-HYDRAULIC ROTARY ACTUATOR FOR AUTOMOTIVE CONVERTIBLE TOP

[75] Inventor: Xudong Yu, Brookfield, Wis.

[73] Assignee: Applied Power Inc., Butler, Wis.

[21] Appl. No.: 336,435

[22] Filed: Nov. 9, 1994

[51] Int. Cl.[6] .......................... F16D 31/02; F15B 11/08; F15B 13/04; B60J 7/00
[52] U.S. Cl. ........................ 60/415; 91/468; 296/107
[58] Field of Search ................... 91/468; 60/415, 60/489, 494; 296/107

[56] References Cited

U.S. PATENT DOCUMENTS

| | | |
|---|---|---|
| 898,516 | 9/1908 | Shevlin . |
| 2,324,023 | 7/1943 | Rappl et al. . |
| 2,596,355 | 5/1952 | Ackermans ............................ 296/107 |
| 2,606,534 | 8/1952 | Pond . |
| 3,359,870 | 12/1967 | Purcell ..................................... 92/121 |
| 3,788,075 | 1/1974 | Holdeman et al. .................... 60/489 X |
| 4,628,690 | 12/1986 | Arai et al. ............................. 60/494 X |
| 4,665,558 | 5/1987 | Burke .................................... 92/121 X |
| 4,964,273 | 10/1990 | Nash . |
| 5,048,295 | 9/1991 | Hoscheler ............................ 60/489 X |
| 5,067,768 | 11/1991 | Fischbach ............................. 297/107 |

FOREIGN PATENT DOCUMENTS

| | | | |
|---|---|---|---|
| 2538676 | 3/1977 | Germany .............................. 60/494 |
| 3149473 | 7/1982 | Germany .............................. 60/489 |
| 58-91902 | 6/1983 | Japan ................................... 91/468 |
| 3-143733 | 6/1991 | Japan .................................. 296/107 |
| 179624 | 3/1934 | Switzerland ........................ 296/107 |

Primary Examiner—John E. Ryznic
Attorney, Agent, or Firm—Quarles & Brady

[57] ABSTRACT

A self-contained rotary actuator assembly has a pump assembly, a precharged hydraulic circuit, and a rotary vane actuator in a single unit. The pump assembly is a bi-directional electric motor driven gerotor pump which is manifolded to a module assembly in which the control elements of the hydraulic circuit are housed. Upon the application of the pressure for driving the rotary actuator in either direction, a pilot operated hydraulic valve is shifted so as to communicate the rotary actuator with the pump. After the pump is turned off, an orifice for the pilot chamber of the valve bleeds the pilot chamber slowly so as to provide a delay in which the rotary actuator holds the convertible top extended or retracted to give the vehicle operator time to latch the top in its closed or open position. In addition, a gas charged precharge chamber in the hydraulic circuit maintains a precharge through a broad range of temperatures.

13 Claims, 4 Drawing Sheets

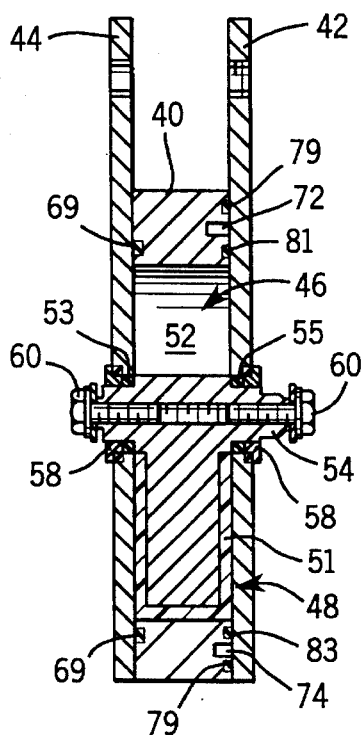
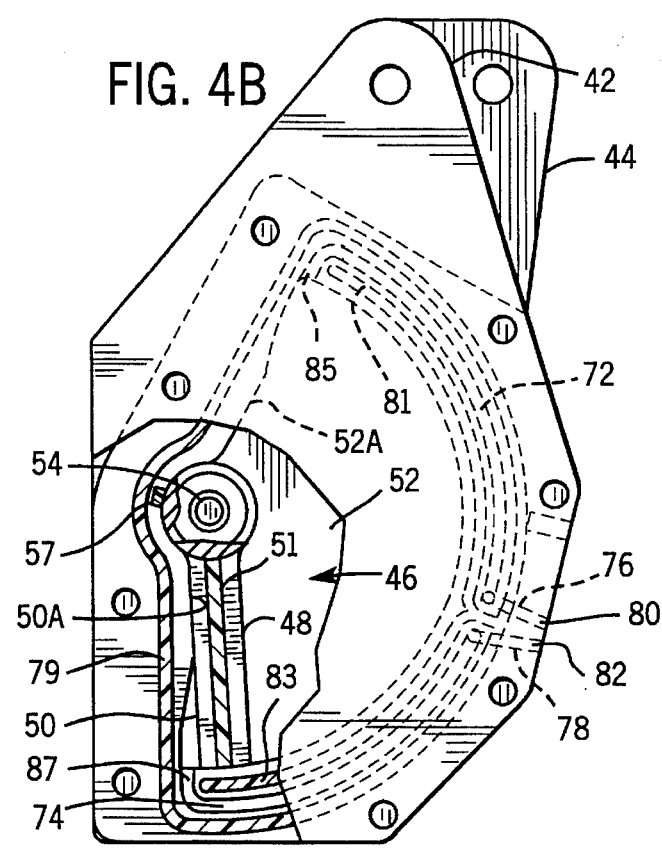
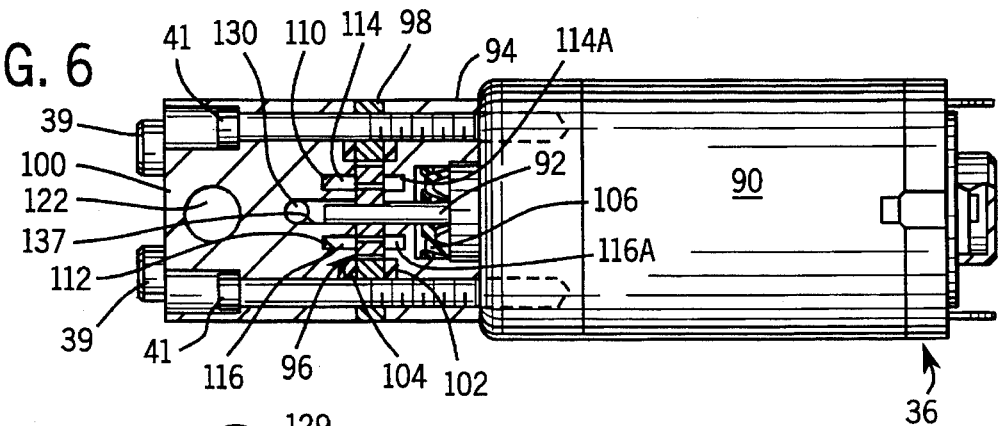
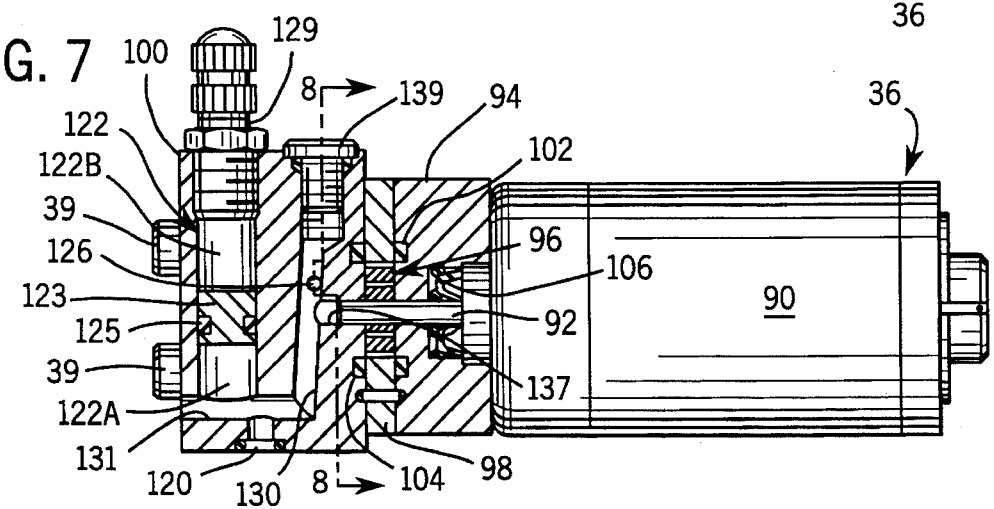

5,467,596

UNITARY ELECTRO-HYDRAULIC ROTARY ACTUATOR FOR AUTOMOTIVE CONVERTIBLE TOP

BACKGROUND OF THE INVENTION

1. Field of the Invention

This invention relates to power operated actuators for opening and closing the convertible top of an automobile, and in particular to such an electro-hydraulic rotary actuator.

2. DISCUSSION OF THE PRIOR ART

Power operated systems for opening and closing the convertible top of an automobile are well known. Typically, these systems employ one or more hydraulic cylinders on each side of the frame (known as the top stack) of the convertible top for rotating the bows of the top stack about a lateral pivot axis, which is usually positioned toward the rear of the passenger compartment. Because the motion required of the bows was rotary, but the cylinders only produced linear motion, the mechanism was required to convert the linear motion of the cylinder to the rotary motion required for operating the top, and therefore was relatively complex. Also, because of the stroke required of the cylinders at acceptable force levels, the cylinders were relatively long. These systems also involved relatively complex plumbing and hydraulic control circuits, which added to the cost of the system.

An electro-hydraulically powered rotary actuator has also been proposed for opening and closing the convertible top of an automobile. U.S. Pat. No. 3,359,870 discloses such a system. While eliminating much of the mechanism associated with hydraulic cylinder operated systems, the prior rotary actuator operated systems still required complex plumbing arrangements. For example, these systems required an external reservoir and/or solenoid or manually operated hydraulic valves. Also, since the operator of the automobile usually must latch the top in position after the hydraulic actuator has opened or closed it, it is desirable to provide a hydraulic system which helps the operator latch the top by holding it open or closed during latching. The present invention is aimed at providing such holding in a simple, efficient and economical rotary actuator system.

SUMMARY OF THE INVENTION

The invention provides a hydro-electric self-contained rotary actuator which addresses the above problems. The actuator includes a rotary vane actuator having a pair of inlet/exhaust ports, a pump for supplying hydraulic fluid under pressure, an electric motor for operating the pump, and a hydraulic circuit for directing fluid between the pump and the rotary vane actuator. The hydraulic circuit includes a control valve having a hydraulic pilot pressure port for shifting the valve from a normal position in which the inlet/exhaust ports are placed in communication with one another and an actuated position in which one of the inlet/exhaust ports is placed in communication with a pressure supply line and the other inlet/exhaust port is placed in communication with a fluid return line. An orifice communicates the pilot pressure port to a pressure relief line such that after the pump is stopped, the pressure in the pilot pressure port persists for a period of time so that the control valve delays shifting from the actuated position to the normal position. Thereby, the actuator holds the top stack in the fully open or fully closed position long enough for the vehicle operator to latch it in position.

In one useful aspect, the hydraulic circuit includes a precharge chamber which maintains a precharge of hydraulic pressure in the hydraulic circuit and pump. Preferably, this is accomplished by providing the precharge chamber with a gas charged portion separated from a hydraulic fluid filled portion by a sliding piston. The gas charge exerts a force on the piston which precharges the hydraulic fluid with a slight pressure. This helps prime the pump even as the fluid expands and contracts through a broad range of temperatures and maintains a positive pressure at the pump inlet to reduce noise associated with cavitation which may otherwise occur at the inlet. Thereby, no external valves, reservoirs or other components are necessary. In addition, other than for the electrical power for the pump motor, the actuator is entirely hydraulically controlled, with no other electrical power or connections needed.

BRIEF DESCRIPTION OF THE DRAWINGS

FIG. 4B is a right side plan view of the vane actuator of FIG. 4A with a portion broken away;

FIG. 5 is a sectional view of the vane actuator as viewed from the plane of the line 5—5 of FIG. 4A;

FIG. 6 is a sectional view of a pump assembly for the rotary actuator as viewed from the plane of the line 6—6 of FIG. 8;

FIG. 7 is a sectional view of the pump assembly as viewed from the plane of the line 7—7 of FIG. 8;

DETAILED DESCRIPTION OF THE PREFERRED EMBODIMENTS

Figure 1:
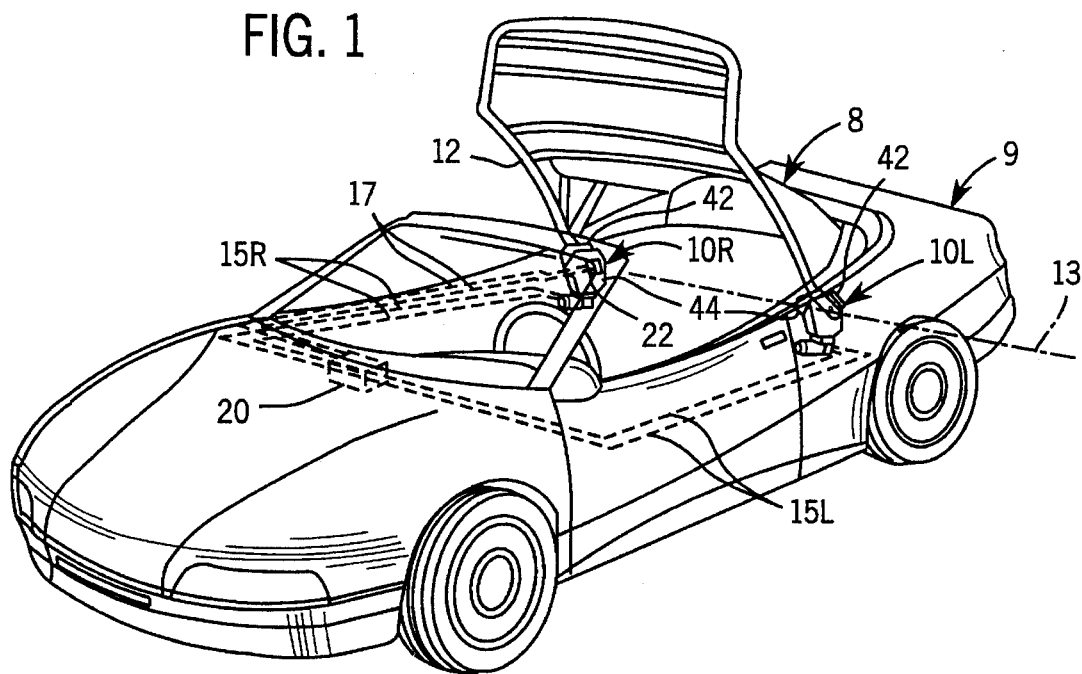
FIG. 1 is a perspective schematic view illustrating an application of a pair of rotary actuators of the invention to a convertible top of an automobile.

FIG. 1 illustrates the invention applied to the convertible top 8 of an automobile 9. Two self-contained rotary actuator (SCRA) assemblies 10L and 10R are applied to the system shown in FIG. 1, with assembly 10L at the left pivot point of the main bow 12 of the top 8 and the assembly 10R at the right pivot point of the main bow 12. The rotary shafts of the left and right SCRA assemblies 10L and 10R are fixed to main bow 12 so as to rotate it about its pivot axis 13, and the housing of each rotary actuator is fixed to the frame or body of the automobile 9 so as to be stationary relative to the frame or body.

As schematically illustrated in FIG. 1, a control unit 20 having switches operable by the driver (not shown) of the automobile for opening or closing the top is incorporated into the dashboard as illustrated (or in the top of the windshield frame) of the automobile. A pair of wires 15L and 15R runs from the control unit for each SCRA assembly 10L and 10R and, as illustrated, a third pair of wires 17 runs from an angle detector 22 mounted on the SCRA assembly 10R to the control unit 20. The angle detector 22 is optional and may be used to provide a signal which may be displayed to the operator as to whether the top is up or down, or somewhere in between. It may also be desirable to have an angle detector on the left SCRA assembly 10L (with associated wires to the control unit 20) so that the position of the left and right SCRA assemblies can be compared and each adjusted accordingly, for example, by a suitable controller, to adjust their speeds to keep them at approximately the same angular position.

Figure 3:
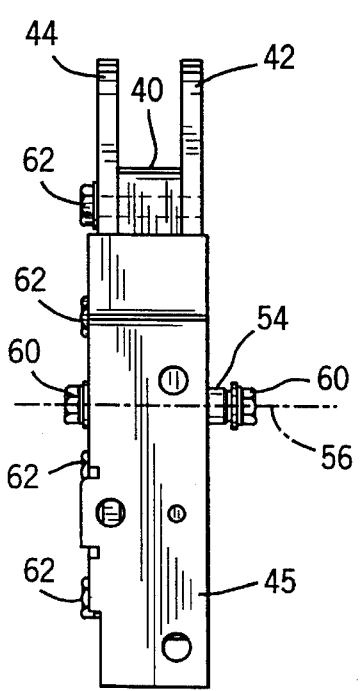
FIG. 3 is a rear plan view of the rotary actuator of FIG. 2.
Figure 2:
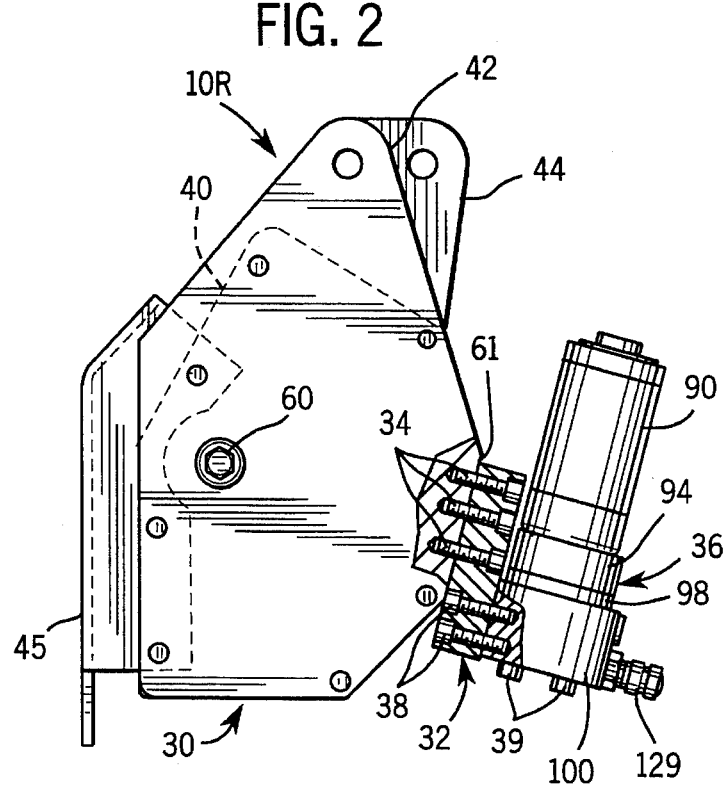
FIG. 2 is a right side plan view of the right (as viewed from the rear of the automobile) rotary actuator illustrated in FIG. 1.

FIGS. 2 and 3 illustrate the SCRA assembly 10R by itself. The left and right SCRA assemblies 10L and 10R are identical except as specifically stated below so that only the right assembly 10R will be completely described in detail, and the differences in the assembly 10L from the assembly 10R will be described.

The SCRA assembly 10R includes a rotary vane actuator 30, a module assembly 32 secured to the actuator 30 by cap screws 34, and a pump assembly 36 secured to the module assembly 32 by capscrews 38. The actuator 30 is a swinging vane type of actuator having a housing made up of actuator body 40, right cover plate 42 and left cover plate 44 (FIGS. 2–5). The body 40 and plates 42 and 44 define a working cavity 46 which is divided by a swinging vane 48 into two variable volume subchambers 50 and 52. Elastomeric sliding seals 51, 53 and 55 are provided between the vane 48 and the housing in grooves formed in the vane 48 (FIGS. 4A and 5) and sliding seal 57 is provided in a groove formed in the body 40 (FIGS. 4A and 4B) so as to prevent fluid communication from one of the subchambers 50, 52 to the other subchamber 52, 50 between the vane 48 and the housing.

The vane 48 is fixed to a shaft 54 which extends through the housing along axis 56 and is journaled in the plates 42 and 44 by bearings 58. Bolts 60 may be threaded into the ends of the shaft 54 so as to fix the shaft 54 of the assembly 10R to the rotor of the angle detector 22, which may simply be a potentiometer type of angle indicator. Bolts 60 are also threaded into the outside ends of the shafts 54 of both assemblies 10L and 10R to fix the shafts 54 to the main bow 12, with the axis 56 of each shaft 54 coaxial with the pivot axis 13 of the main bow 12 so that the shaft 54 rotates the main bow 12 about the coaxial axes 13 and 56 to raise and lower the top. Any suitable means may be provided to prevent relative rotation between the shafts 54 and the main bow 12, such as making each shaft 54 "D" shaped or with parallel flat surfaces (sometimes referred to as a double "D" shape) and fitting it into a similarly shaped hole in the main bow 12, or for example by providing a splined or keyed connection between each shaft 54 and the main bow 12.

As is well known, when fluid is pumped into subchamber 50, vane 48 rotates about axis 56 in a clockwise direction, with the pump drawing fluid out of the subchamber 52, until vane 48 reaches the fixed end 52A of subchamber 52. When the pressure is applied to subchamber 52, however, the vane 48 is rotated counter-clockwise (as viewed in FIG. 4A) about axis 56, with the pump drawing fluid out of subchamber 50, thereby rotating shaft 54 counter-clockwise until vane 48 reaches the fixed end 50A of subchamber 50. If direct fluid communication is provided between the chambers 50 and 52 externally of the housing, and the shaft 54 is rotated, for example by manually moving the main bow 12 between the open and closed positions as might be necessary in case of an electrical failure, then fluid is squeezed from one of the chambers 50 and 52 to the other (i.e., in the counterclockwise direction fluid would be squeezed out of subchamber 52 and into subchamber 50, and if the direction was reversed, fluid would be squeezed out of subchamber 50 and into subchamber 52).

For each automobile convertible top, two essentially identical assemblies 10L and 10R would normally be provided with their plates 42 and 44 reversed. Thus, assemblies 10L and 10R are the same except that plate 42 is on the left side of assembly 10L and plate 44 is on the right side of assembly 10L. Plates 42 and 44 are adapted to be fixed to the automobile's frame or chassis so as to secure the housing as stated above, and a mounting bracket 45 (FIGS. 2 and 3) for the same purpose may also be provided.

The plates 42 and 44 and body 40 are assembled together using bolts 62. Seals are provided on the axial faces of the body 40 in order to make the cavity 46 fluid tight and define passages from ports 80, 82 opening in the porting pad 61 to respective chamber ports 85, 87 (FIG. 4B). The ports 80, 82 and associated passages 76, 78 and 72, 74 are sealed between the plate 42 and the body 40 against fluid communication with one another, so that port 80, passageways 76 and 72 and port 85 can deliver fluid to or from subchamber 52 and so that port 82, passageways 78 and 74 and port 87 can deliver fluid to or from subchamber 50.

Figure 4A:
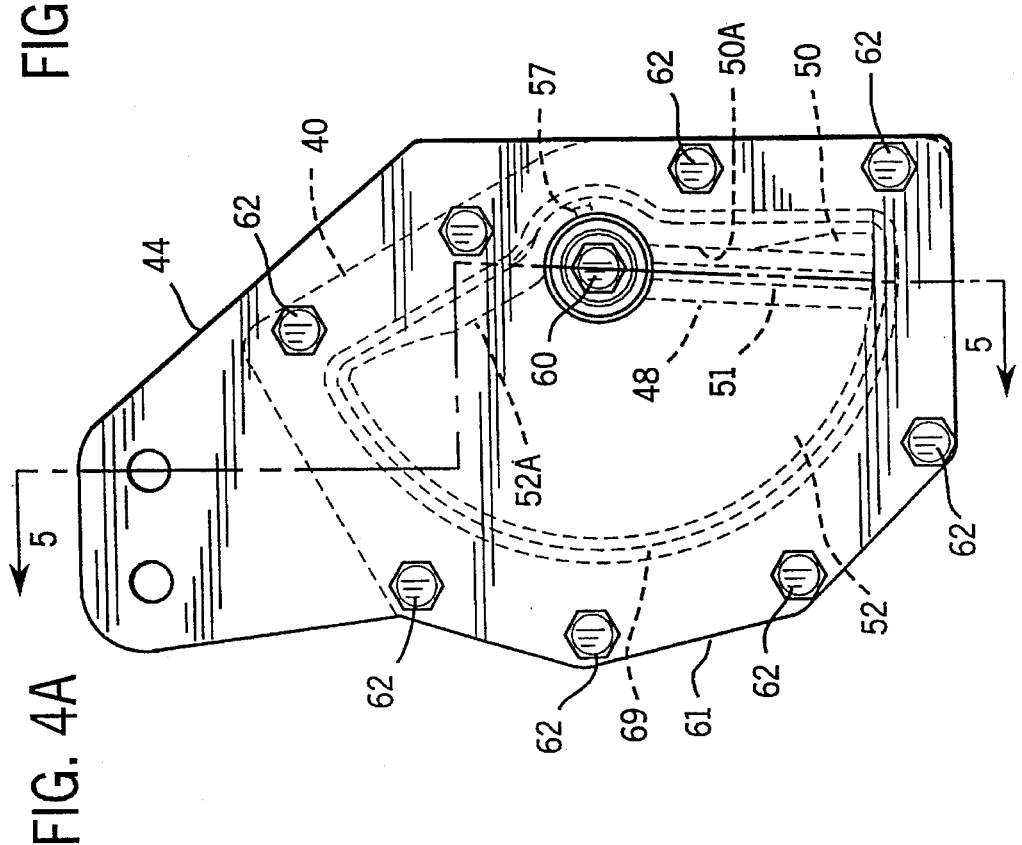
FIG. 4A is a left side plan view of a vane actuator for the rotary actuator of FIG. 2.

As shown in FIGS. 4A, 4B and 5, a seal 69 is provided in an axially facing groove of body 40 which interfaces with the plate 44 in order to provide a fluid tight seal at that interface all the way around the periphery of the cavity 46. On the opposite axial side of the body 40, a seal is provided which has an outer part 79 which surrounds the cavity 46 to seal the interface with plate 42. This seal also has branches 81 and 83, which branch off from the outer part 79 to envelope the flow passages 72 and 74 so that the passages 72 and 74 are sealed from one another as the vane 48 pivots. The passages 72 and 74 are also sealed from the cavity 46 except at their respective ends 85 and 87. The end 85 opens into the fixed end 52A of subchamber 52 and the end 87 opens into the fixed end of 50A of subchamber 50. Passages 76 and 78 are provided in the body 40 which provide communication between passages 72 and 74 and ports 80 and 82, respectively.

Figure 8:
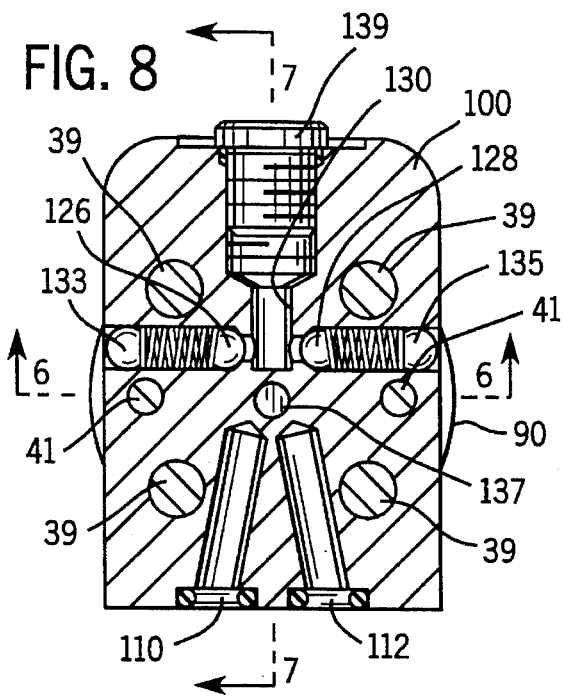
FIG. 8 is a sectional view of the pump assembly as viewed from the plane of the line 8—8 of FIG. 7.

Referring to FIGS. 6–8, the pump assembly 36 is a reversible miniaturized gerotor pump, although any suitable type of pump could be used to practice the invention. The pump assembly 36 includes a motor 90, which in the preferred embodiment is a 12 volt DC reversible motor. The motor 90 has a shaft 92 which extends through a front cover 94 to drive a gerotor set 96 which is journaled within a gerotor plate 98. A back cover 100 caps off the pump assembly 36. The gerotor plate 98 is sealed to the front and back covers by o-ring seals 102 and 104 and the shaft 92 is sealed to the front cover 94 by a rotary seal 106. The pump assembly 36 is held together by bolts 39, which hold together the plates 94, 98 and 100, and bolts 41 which secure the motor 90 to the assembly.

The operation of gerotor-type pumps is well-known and need not be described here in great detail. Suffice it to say that shaft 92 drives the gerotor set 96 in one direction or the other, dependent upon the polarity of the voltage applied to motor 90, to pump fluid in one direction or the other between ports 110 and 112, which are provided in the back cover 100. As can be seen in FIG. 6, port 110 communicates with a pumping chamber 114 on one side of the gerotor set 96 and port 112 communicates with the pumping chamber 116 on the other side of the gerotor set 96. Each of the chambers 114 and 116 (which are separate) has a shadow chamber 114A or 116A to maintain pressure balance axially on the gerotor set 96.

A tank port 120 is also formed in the back cover 100 which communicates with the hydraulic fluid filled lower portion 122A of a precharge chamber 122, which is separated from upper portion 122B by piston 123 having sliding o-ring seal 125. Upper portion 122B is charged with a gas such as air or nitrogen to exert a downward force on piston 123 for maintaining a hydraulic precharge (for example, 5–10 psig) in the hydraulic system of the actuator 10. A Schroeder valve 129 of the type used for automobile tires is threaded into cover 100 and used for introducing a gas charge into the upper portion 122B. Since hydraulic fluid expands and contracts somewhat with temperature changes, and a vehicle can be subjected to a relatively wide range of temperatures, the gas charge is desirable to maintain a precharge in the hydraulic system so that the pump assembly 36 is always properly primed. Also, it is desirable to maintain a positive pressure at the pump inlet to reduce cavitation noise.

Check valves 126 and 128 communicate at their entry ends with the precharge chamber lower portion 122A through passages 130 and 131 and at their exit ends (which are plugged by balls 133 and 135) through suitable passages (not shown) with the ports 110 and 112, respectively. Shaft 92 is also in communication with tank port 120 via passageways 137, 130 and 131. Plug 139 plugs the top end of passageway 130.

Figure 9:
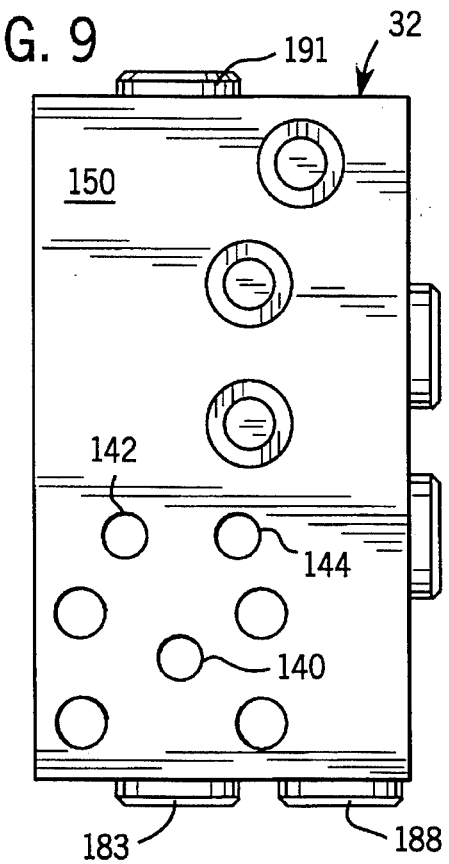
FIG. 9 is a front plan view of a module assembly for the rotary actuator.
Figure 10:
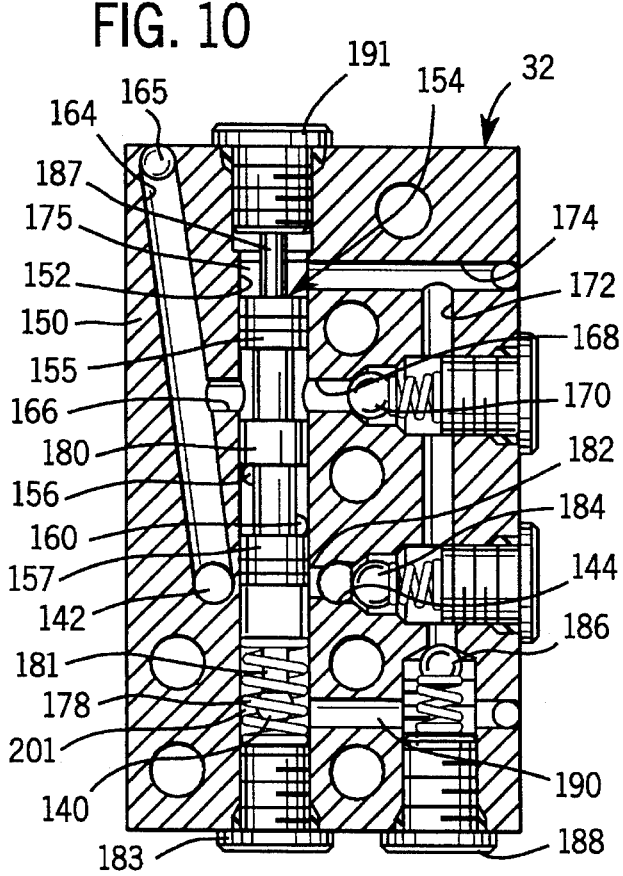
FIG. 10 is a sectional view through the module assembly of FIG. 9.
Figure 11:
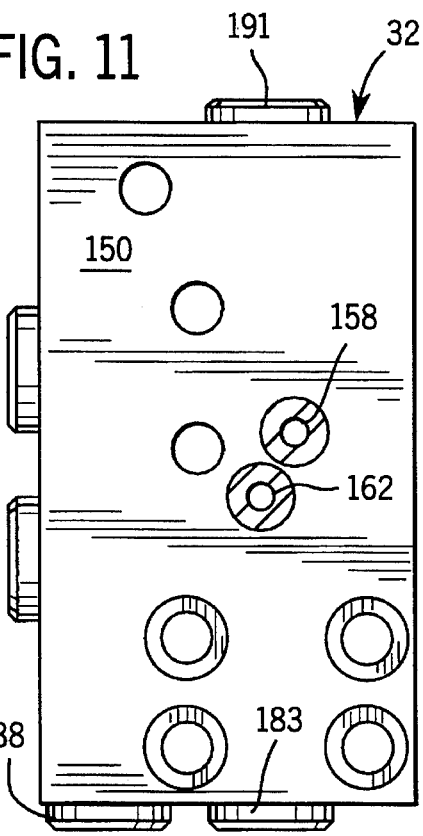
FIG. 11 is a plan view of the rear of the module assembly of FIGS. 9 and 10.

The pump assembly 36 is fixed to the module assembly 32 so that tank port 120 communicates with port 140 (FIG. 9), port 110 communicates with port 142 and port 112 communicates with port 144. Referring particularly to FIG. 10, the module assembly 32 includes a housing 150 having a main bore 152 in which is slidably received a valve spool 154 having end lands 155 and 157. A passageway 156 which opens into the main bore 152 communicates with port 158 (FIG. 11) of the module assembly and a passageway 160 which opens into the main bore 152 communicates with a port 162 of the housing 150.

Upon the introduction of pressurized fluid at port 142, passageway 164 (which is plugged by ball 165 at the top of the housing 150 as shown in FIG. 10), passageway 166, the main bore 152, and passageway 168 communicate the pressurized fluid to ball type one-way check valve 170, which allows the pressurized fluid to pass through passageways 172 and 174 into a pilot chamber 175 of the housing 150. Pressurizing the pilot chamber 175 shifts spool 154 downwardly (as viewed in FIG. 10) against the bias of spring 178 in chamber 201, which is vented to tank port 140, until pin 181 of the spool 154 abuts against plug 183. In so doing, when land 180 of spool 154 shifts below the position where passageway 156 opens into bore 152, communication is established between port 142 and the passageway 156, thereby communicating the pressurized fluid from the port 142 to the port 158, to supply subchamber 52 with fluid.

In the bottomed out position of the spool 154 in which pin 181 abuts plug 183, the land 180 resides between the positions where the passageways 156 and 160 open into the main bore 152 so that communication between the passageways 156 and 160 is prevented. In addition, communication is established between the passageway 160 and the port 144 through the main bore 152 and passageway 182. Thereby, communication is established between port 162 and port 144 for return of fluid from subchamber 50.

If the pump 36 is reversed and pressure is introduced at port 144, it is communicated past check ball 184 to passageway 172 and 174 into pilot chamber 175, to once again shift spool 154 to an actuated position in which it is bottomed out against the bias of spring 178. Again, in this position, the land 180 is between the positions where the passageways 156 and 160 intersect the main bore 152. In this position, the passageway 156 is placed in communication with port 142 (via passageways 166 and 164) for return of fluid from subchamber 52, and the passageway 160 is placed in communication with the port 144 via the main bore 152 and passageway 182 to supply pressurized fluid to subchamber 50.

When no pressure is provided at either port 142 or 144, the spool 154 is held in its normal position by spring 178, in which pin 187 of spool 154 abuts plug 191. In that position, shown in FIG. 10, ports 162 and 158 are in communication with one another via passageways 156 and 160 and the main bore 152. However, whenever either of the ports 142 or 144 is pressurized, that communication is cut off and the port 142 is placed in communication with the port 158 and the port 144 is placed in communication with the port 162.

It should be noted in addition that the module assembly 32 includes a pressure relief valve 186 which relieves the pressure in passageway 172 (which intersects the outlet chamber of each of the valves 170 and 184) so as to limit the maximum pressure obtainable in the passageway 172. The maximum pressure obtainable in passageway 172 may be adjusted by turning plug 188 so as to vary the spring force exerted on the ball of valve 186, or by changing the spring of the valve 186 so as to exert a greater or lesser force. Passageway 190 provides communication between the outlet of valve 186 and the chamber 201 which houses spring 178, which as stated above communicates with the tank port 140.

When the module assembly 32 is mounted to the rotary vane actuator 30, port 158 is placed in communication with port 80 and port 162 is placed in communication with port 82. Therefore, when port 158 is pressurized, subchamber 52 is pressurized and shaft 54 is driven counterclockwise (as viewed in FIG. 4A) and when port 162 is pressurized, subchamber 50 is pressurized and shaft 54 is driven clockwise.

Figure 12:
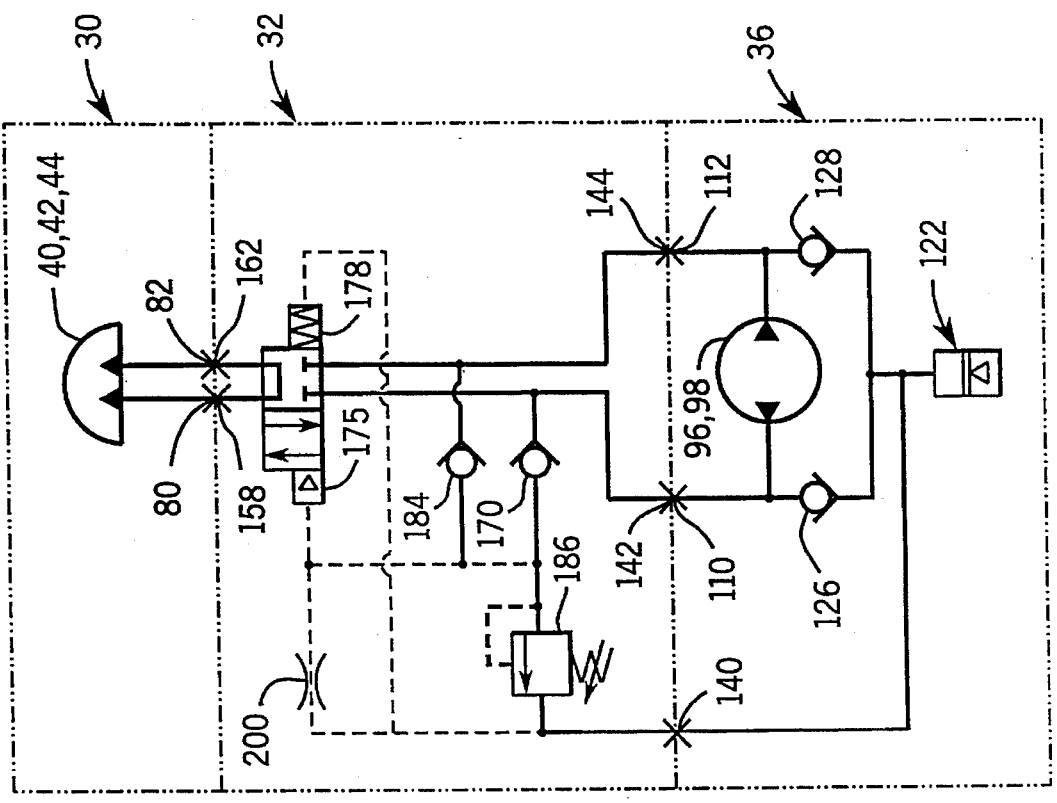
FIG. 12 is a schematic of the hydraulic circuitry of the rotary actuator of FIG. 2.

FIG. 12 illustrates a schematic of the hydraulic circuit for a rotary actuator of the invention. Reference numerals used above for corresponding elements have been applied to FIG. 12. An orifice 200 is shown in the circuit for bleeding the pressure from the pilot chamber 175 so as to hold the spool 154 in the actuated position for a period of time even after the pump 36 is switched off. This is to allow the vehicle operator time to latch the top in either the open or the closed position while the top is held by the rotary vane actuator 30. However, once the pressure in chamber 175 is bled off through the orifice, spring 178 returns the spool to its normal position in which communication is provided between the two sides of the vane actuator 30 so that if necessary, the convertible top can be opened or closed by manually moving the top.

The orifice 200 may be provided in any suitable manner, preferably in the module assembly 32. In the preferred embodiment, the orifice 200 is provided by sizing the diameter of the lands 155, 180 and 187 slightly smaller than the main bore 152 (e.g., a spool diameter of 0.2490–0.2491 and a bore diameter of from 0.2497–0.2505) so as to allow leakage past them to the tank port 140. Thereby, the pressure from chamber 175 (and from the passageway 156 and/or 160) is gradually bled past the lands 155, 180 and 157 to the spring chamber 201, which communicates with the tank port 140 through passageway 141, and thereby is slowly relieved so as to hold the top open or closed for a long enough period of time to allow the operator to latch it in position.

Many modifications and variations to the preferred embodiment described above will be apparent to those skilled in the art. Therefore, the invention should not be limited to the embodiments described, but should be defined by the claims which follow.

I claim:

1. In a hydro-electric rotary actuator of the type having a rotary vane actuator having a pair of ports, one of said ports communicating with one side of a vane of said actuator and the other port communicating with an opposite side of said vane, a pump for supplying hydraulic fluid under pressure, an electric motor for operating said pump and a hydraulic circuit for directing fluid between said pump and said ports, said hydraulic circuit including a control valve having a normal position in which said ports are placed in communication with one another and an actuated position in which one of said ports is placed in communication with a pressure supply line and the other port is placed in communication with a fluid return line, the improvement wherein:

said control valve has a hydraulic pilot pressure port for shifting said valve from said normal position to said actuated position when pressure is applied to said port; and an orifice communicates said pilot pressure port to a pressure relief line such that after said electric motor is stopped, a pressure in said pilot pressure port persists for a period of time so that said control valve delays shifting from said actuated position to said normal position.

2. The improvement of claim 1, wherein said control valve is a four-way, two position spring return valve.

3. The improvement of claim 1, wherein said pump has two inlet/outlet ports, each of which communicates with a separate one-way check valve which only allows flow past it away from the associated pump inlet/outlet port, and both said check valves are connected to a single pressure relief valve.

4. The improvement of claim 1, wherein said hydraulic circuit further includes a precharge chamber which maintains a precharge of hydraulic pressure in said circuit and pump.

5. The improvement of claim 4, wherein said precharge chamber includes a gas charged portion and a hydraulic fluid filled portion, said portions being sealed from one another by a sliding piston.

6. The improvement of claim 4, wherein said precharge chamber is isolated from elevated hydraulic pressures by one or more one way check valves.

7. The improvement of claim 1, wherein said vane actuator, said pump, said motor and said circuit are secured together as a single unit which contains a precharge of sufficient hydraulic fluid for operating said unit.

8. In a hydro-electric system for opening and closing a convertible top of an automobile of the type having a pair of rotary actuators, one at each side of the top, the improvement wherein:

each actuator is self contained, including in a single unit a rotary vane actuator having a pair of ports, a pump, an electric motor for driving said pump, a hydraulic circuit for routing and regulating a flow of hydraulic fluid between said pump and said rotary vane actuator and a supply of hydraulic fluid for operating said actuator.

9. The improvement of claim 8, wherein:

said hydraulic circuit includes a control valve which has a hydraulic pilot pressure port for shifting said valve between a normal position in which said ports are placed in communication with one another and an actuated position in which one of said ports is placed in communication with a pressure supply line and the other port is placed in communication with a fluid return line; and an orifice communicates said pilot pressure port to a pressure relief line such that after said electric motor is stopped, a pressure in said pilot pressure port persists for a period of time so that said control valve delays shifting from said actuated position to said normal position.

10. The improvement of claim 8, wherein said pump has two inlet/outlet ports, each of which communicates with a separate one-way check valve which only allows flow past it away from the associated pump inlet/outlet port, and both said check valves are connected to a single pressure relief valve.

11. The improvement of claim 1, wherein said hydraulic circuit further includes a precharge chamber which maintains a precharge of hydraulic pressure in said circuit and pump.

12. The improvement of claim 11, wherein said precharge chamber includes a gas charged portion and a hydraulic fluid filled portion, said portions being sealed from one another by a sliding piston.

13. The improvement of claim 11, wherein said precharge chamber is isolated from elevated hydraulic pressures by one or more one way check valves.

* * * * *